US012717963B2

(12) United States Patent
Welker

(10) Patent No.: US 12,717,963 B2
(45) Date of Patent: Aug. 25, 2026

(54) THREE-DIMENSIONAL MAPPING FOR DATA PROTECTION

(71) Applicant: Aurelius Technologies Group, Inc., Layton, UT (US)

(72) Inventor: Ryan Welker, Layton, UT (US)

(73) Assignee: Aurelius Technologies Group, Inc., Layton, UT (US)

( * ) Notice: Subject to any disclaimer, the term of this patent is extended or adjusted under 35 U.S.C. 154(b) by 43 days.

(21) Appl. No.: 19/017,221

(22) Filed: Jan. 10, 2025

(65) Prior Publication Data

US 2025/0252214 A1 Aug. 7, 2025

Related U.S. Application Data

(60) Continuation of application No. 18/127,975, filed on Mar. 29, 2023, now Pat. No. 12,223,089, which is a division of application No. 16/999,567, filed on Aug. 21, 2020, now Pat. No. 11,651,102, which is a continuation-in-part of application No. 16/897,993, filed on Jun. 10, 2020, now Pat. No. 11,853,435.

(60) Provisional application No. 62/892,329, filed on Aug. 27, 2019, provisional application No. 62/861,905, filed on Jun. 14, 2019.

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01); *G06F 21/6209* (2013.01); *G06F 21/6227* (2013.01)

(58) Field of Classification Search
CPC ............... G06F 21/6245; G06F 21/602; G06F 21/6227; G06F 21/6209
See application file for complete search history.

(56) References Cited

U.S. PATENT DOCUMENTS

| | | | |
|---|---|---|---|
| 6,154,213 | A | 11/2000 | Rennison et al. |
| 7,958,561 | B1 | 6/2011 | Croak et al. |
| 8,516,601 | B2 | 8/2013 | Goodwin et al. |
| 11,017,436 | B1 | 5/2021 | Stoica et al. |
| 2003/0144843 | A1 | 7/2003 | Belrose |
| 2005/0240909 | A1 | 10/2005 | Tersigni |
| 2006/0101285 | A1 | 5/2006 | Chen et al. |
| 2008/0228824 | A1 | 9/2008 | Kenedy et al. |
| 2012/0110432 | A1 | 5/2012 | Mei et al. |
| 2012/0284801 | A1 | 11/2012 | Goodwin et al. |
| 2014/0280584 | A1 | 9/2014 | Ervine |
| 2016/0330237 | A1 | 11/2016 | Edlabadkar |
| 2017/0238035 | A1 | 8/2017 | Perez |
| 2018/0020243 | A1 | 1/2018 | Ni et al. |
| 2019/0073734 | A1 | 3/2019 | Reischer et al. |

*Primary Examiner* — Ellen Tran
(74) *Attorney, Agent, or Firm* — Foley & Lardner LLP

(57) ABSTRACT

A method for data filtering that identifies a topic of interest for a user and individual sub-topics within the topic the user could be, or is, interested in. A three-dimensional map depicting a topic of interest containing markers for the sub-topics is created and used to specify a level of detail about the user's interest in the sub-topics that can be shared to or used by an external source.

20 Claims, 8 Drawing Sheets

200A

THREE-DIMENSIONAL MAPPING FOR DATA PROTECTION

CROSS-REFERENCE TO RELATED APPLICATIONS

This application is a continuation of U.S. patent application Ser. No. 18/127,975, filed Mar. 29, 2023, titled THREE DIMENSIONAL MAPPING FOR DATA PROTECTION," which is a divisional of U.S. patent application Ser. No. 16/999,567, filed Aug. 21, 2020, titled "THREE DIMENSIONAL MAPPING FOR DATA PROTECTION," which claims priority to and the benefit of U.S. Provisional Application Ser. No. 62/892,329, filed Aug. 27, 2019, and titled "THREE DIMENSIONAL MAPPING FOR DATA PROTECTION," which is incorporated herein by reference in its entirety. U.S. patent application Ser. No. 16/999,567 is also a continuation-in-part of U.S. patent application Ser. No. 16/897,933, filed Jun. 10, 2020, and titled "INTERACTIVE OBFUSCATION AND INTERROGATORIES," which is incorporated herein by reference, and which claims priority to and the benefit of: (i) U.S. Provisional Patent Application Ser. No. 62/861,905, filed Jun. 14, 2019, and titled "INTERACTIVE OBFUSCATION AND INTERROGATORIES," which is incorporated herein by reference; and (ii) U.S. Provisional Patent Application Ser. No. 62/892,329, filed Aug. 27, 2019, and titled "THREE-DIMENSIONAL MAPPING FOR DATA PROTECTION," which is incorporated herein by reference. The foregoing patent applications are each incorporated herein by this reference in their entirety.

BACKGROUND

Technical Field

This disclosure generally relates to data protection. More specifically, the present disclosure relates to controlling specificity of data.

Related Technology

Mass amounts of electronic data are collected every day in nearly every country around the world. Internet searches, security camera footage, and GPS software help to create a picture of an individual's thoughts and actions throughout the course of the individual's normal day-to-day activities. Accordingly, data on an individual can be stored and shared widely for various purposes.

There is a certain level of convenience that can come from allowing all data generated by a user to be accessed freely by any interested party. For instance, companies that benefit from online advertisements often desire as much data as possible about individuals in order to assist such companies in their targeted advertising based on individuals' online shopping history. Suggestions made by such companies utilizing the data may be useful to individuals who engage in online shopping.

Unfortunately, although data distribution provides many potential benefits, there are attendant risks. When personal data is widely distributed and used, uncertainty arises as to who has access to an individual's data. Data distribution can allow unwanted parties to track a user's data for malicious reasons such as discovering when the user is leaving for an extended period in order to invade the user's vacant residence. Other important data gathered on the user can be sold to entities against the wishes of the user, such as to spammers and other malevolent parties.

Accordingly, there are several disadvantages associated with widespread user data collection that can be addressed.

BRIEF SUMMARY

Implementations of the present disclosure solve one or more of the foregoing or other problems in the art with data filtering. In particular, one or more implementations can include a method that identifies a topic of interest for a user and further identifies sub-topics of interest within the topic. The identified topics are input into a three-dimensional map created for the topic of interest and sub-topic markers are placed throughout the map. Using the three-dimensional map, a level of detail can be defined by placing an indication marker within the three-dimensional map. The distance between the indication marker and any sub-topic marker can be used to calculate the how explicit the sharable information can be about the user's interest in the sub-topic associated with the sub-topic marker.

A user profile can be included in some embodiments. The user profile contains information about the topics and/or sub-topics in which user has shown interest. More specifically, the user profile can include the level of detail of a sub-topic that the user has defined as sharable. The user profile can be updated after the user adjusts the level of detail they permit to be shared. Updating the user profile can further include the user being identified to have interest in additional topics and/or sub-topics.

Some embodiments include rendering a graphic that is displayed to the user for manual adjustments. The graphic of the three-dimensional image would allow the user to move the indication marker according to what level of detail they wanted allowed on each sub-topic.

Some embodiments include rendering a graphic of one or more sub-topic projected onto a single axis sliding scale. The user would interact with a single sub-topic and could move a level of detail marker along the single axis sliding scale to increase or decrease level of detail captured and/or shared. An equivalent change could occur automatically to update the three-dimensional map according to the single axis sliding scale during/after interaction with the single axis sliding scale by the user.

Embodiments of the present disclosure can include a method for sending secure user data. When data is to be sent from the user's device to an end location, the data can be assembled and packaged. The package can include the level of detail provided for the collected data mapped in the three-dimensional map. A cipher can be created to allow a source access to the data within the obfuscated package. After the package is obfuscated, the package and associated cipher are sent along a pipeline to the end location.

Some embodiments can include a spin and lock encoding technique to obfuscate the package in the data. The cipher for the obfuscation can be created, in some embodiments, as a call and response key or a biometric key.

In additional embodiments, the package can contain data for more than one user and provide multiple ciphers that allow access to the data one or more user within the package.

Accordingly, a method for data protection and obfuscation is disclosed.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope.

In the drawings, multiple instances of an element may each include separate letters appended to the element number. For example, two instances of a particular element "100" may be labeled as "100*a*" and "100*b*." In that case, the element label may be used without an appended letter (e.g., "100") to generally refer to every instance of the element, while the element label will include an appended letter (e.g., "100*a*") to refer to a specific instance of the element. Similarly, a drawing number may include separate letters appended thereto. For example, FIG. 2 may include FIG. 2A and FIG. 2B. In that case, the drawing number may be used without the appended letter (e.g., FIG. 2) to generally refer to every instance of the drawing, while the drawing label will include an appended letter (e.g., FIG. 2A) to refer to a specific instance of the drawing. The disclosure will be described and explained with additional specificity and detail through the use of the accompanying drawings in which.

Figure 1A:
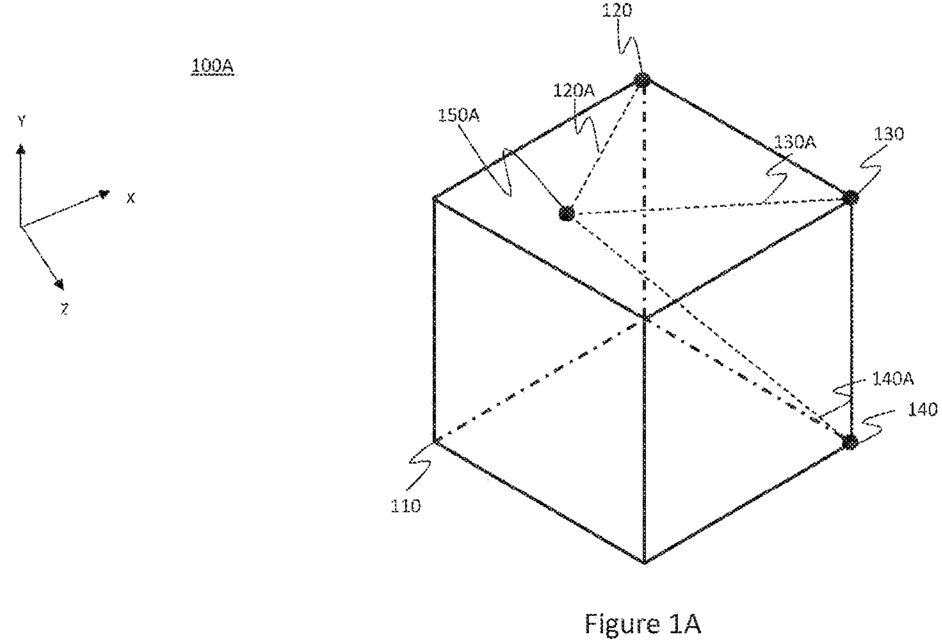
FIGS. 1A-IC illustrate schematic representations of three-dimensional maps with indication and sub-topic markers for determining the level of detail at which to provide data to external systems.

Additional embodiments of the present disclosure are shown and discussed in U.S. patent application Ser. No. 16/897,993, filed Jun. 10, 2020 and titled "INTERACTIVE OBFUSCATION AND INTERROGATORIES," which is incorporated herein by reference and U.S. Provisional Patent Application Ser. No. 62/861,905, filed Jun. 14, 2019 and titled "INTERACTIVE OBFUSCATION AND INTERROGATORIES," which is incorporated herein by reference.

DETAILED DESCRIPTION

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

Abbreviated List of Defined Terms

To assist in understanding the scope and content of the foregoing and forthcoming written description and appended claims, a select few terms are defined directly below.

Herein, the term "three-dimensional map" can be used interchangeably with "map" and "3-d map".

Unless defined otherwise, all technical and scientific terms used herein have the same meaning as commonly understood by one of ordinary skill in the art to which the present disclosure pertains.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," "involves," "contains," etc.), and similar terms as used herein, including within the claims, shall be inclusive and/or open-ended, shall have the same meaning as the word "comprising" and variants thereof (e.g., "comprise" and "comprises"), and do not exclude additional un-recited elements or method steps, illustratively.

It will be noted that, as used in this specification and the appended claims, the singular forms "a," "an" and "the" include plural referents unless the context clearly dictates otherwise. Thus, for example, reference to a singular referent (e.g., "widget") includes one, two, or more referents. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal" and the like are used herein solely to indicate relative directions and are not otherwise intended to limit the scope of the disclosure and/or claimed invention.

To facilitate understanding, like reference numerals (i.e., like numbering of components and/or elements) have been used, where possible, to designate like elements common to the figures. Specifically, in the exemplary embodiments illustrated in the figures, like structures, or structures with like functions, will be provided with similar reference designations, where possible. Specific language will be used herein to describe the exemplary embodiments. Nevertheless, it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

Overview of Three-Dimensional Tonic-Based Data Protection and Obfuscation

Humans generate massive amounts of data every day through internet searches, social media posts, and by using GPS navigation software. Utilization of such data by external sources can be convenient for users but can also pose a material risk to an individual if the data is used by the external sources with malicious intent. Additionally, or alternatively, users may value their privacy and want to have better control of the sharing of their personal information with third parties.

At least some embodiments of the present disclosure enable improved data protection and obfuscation. In some instances, when a user has been identified to have interest in a certain topic, a three-dimensional map of sub-topics is created. The map is then used to determine a level of detail that can be disclosed about the user's preferences and interactions within that sub-topic.

A topic of interest for a user and sub-topics of interest within the topic are input into a three-dimensional map created for the topic of interest. The map can contain a point of origin which acts as a zero point from which all measurements are made. Sub-topic markers are placed throughout the map at a distance away from the point of origin. An indication marker is placed in the map between the sub-topic markers and the point of origin and can be adjusted by the user. The relation between the indication marker, the sub-topic markers, and/or the point of origin is used to determine a level of detail that will be disclosed to one or more external computing systems about the user's preferences and/or interactions within one or more sub-topic.

In some embodiments, a user profile can be created to store the information about the user's preferences and/or interactions. The user profile can contain topics and sup-topics for a user as well as the level of detail for one or more sub-topics the user has defined as capturable/shareable.

When the user's data is transferred to an end location, the data for the user is compiled and packaged. In some embodiments, the package is obfuscated, and one or more ciphers are created and sent along the pipeline with the obfuscated package. The ciphers can be created using the user profile and/or the level of detail provided by the user and can be modeled as spin and lock ciphers, call and response ciphers, etc. In some embodiments, the cipher enables an intermediary external source along the pipeline to unlock portions of the data the user has determined to be accessible by the intermediary external source.

Attention is now directed to FIG. 1A which depicts an embodiment of a three-dimensional map 100A. The three-dimensional map 100A represented in FIG. 1A is modeled as a cube, but it will be appreciated the pictorial representations of the three-dimensional map throughout the disclosure are not limiting; nor are they necessarily indicative of the exact shape of the three-dimensional map of the present disclosure. Further, because the embodiment of the three-dimensional map depicted in FIG. 1A is a schematic representation only, the graphical interpretations may not accurately depict the nuances of the spatial mapping of the present disclosure, such as geometric shapes and distances of key elements in the map.

A point of origin 110, is depicted in an embodiment to be set at an edge of the three-dimensional map 100A. The point of origin 110 represents a reference point to act as a zero from which distances can be determined/measured. As illustrated, a plurality of sub-topic markers (120, 130, 140) are represented on three-dimensional map 100A. Sub-topic marker 120 can represent a sub-topic that is different from a sub-topic indicated by sub-topic marker 130. Furthermore, both sub-topic marker 120 and sub-topic marker 130 represent sub-topics that are different from a sub-topic represented by sub-topic marker 140. An indication marker 150A indicates the level of detail a user has determined can be captured/shared. For instance, in some embodiments, the distance between the indication marker 150A and sub-topic marker 120 (represented by distance 120A) indicates the level of detail at which data pertaining to the sub-topic represented by sub-topic marker 120 will be captured/shared. Similarly, in some instances, the distance between the indication marker 150A and sub-topic marker 130 (represented by distance 130A) indicates the level of detail at which data pertaining to the sub-topic represented by sub-topic marker 130 will be captured/shared. In addition, in some implementations, the distance between the indication marker 150A and sub-topic marker 140 (represented by distance 140A) indicates the level of detail at which data pertaining to the sub-topic represented by sub-topic marker 140 will be captured/shared.

In the illustration shown in FIG. 1A, distance 120A is shorter than both distance 130A and distance 140A, and distance 130A is shorter than distance 140A. Accordingly, because the indication marker 150A is positioned closest to sub-topic marker 120, data related to the sub-topic represented thereby will be captured/shared with a relatively high level of detail. Similarly, because the indication marker 150A is positioned furthest from sub-topic marker 140, data related to the sub-topic represented thereby will be captured/shared with a relatively low level of detail.

Figure 1B:
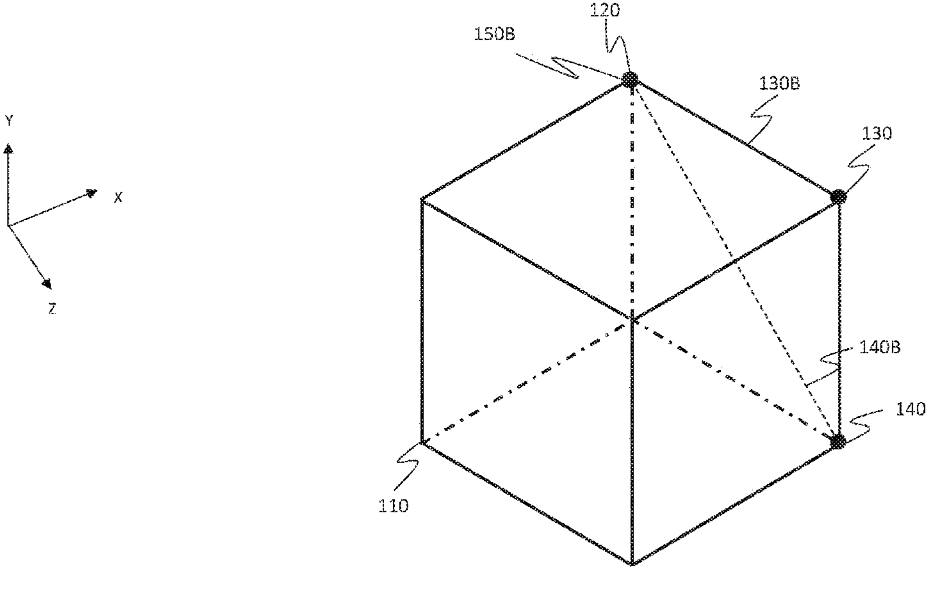
FIG. 1D illustrates a schematic representation of a three-dimensional map with a plurality of indication markers associated with different sub-topics for determining the level of detail, for each sub-topic, at which to provide data to external systems.
FIG. 1 E illustrates a schematic representation of a three-dimensional map with a plurality of aspect markers associated with a sub-topic marker.

FIG. 1B shows an embodiment wherein the indication marker ISOB is positioned at the same position as sub-topic marker 120. As shown in the embodiment represented in FIG. 1B, the distance between the indication marker 150B and sub-topic marker 120 is zero, the distance between the indication marker 150B and sub-topic marker 130 is represented by distance 130B, and the distance between the indication marker 150B and sub-topic marker 140 is represented by distance 140B. As is evident in FIG. 1B, distance 140B is greater than distance 130B. Accordingly, data related to the sub-topic represented by sub-topic marker 120 will be shared/captured with a maximum level of detail (e.g., all aspects of the user's interest in the sub-topic will be shared/captured), whereas a lower level of data detail will be associated with the sub-topics represented by sub-topic markers 130 and 140 (with the sub-topic represented by sub-topic marker 140 having the lowest level of detail associated therewith, by reason of having the greatest distance 140B between the sub-topic marker 140 and the indication marker 150B).

Figure 1C:
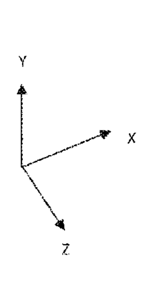
Figure 1C:
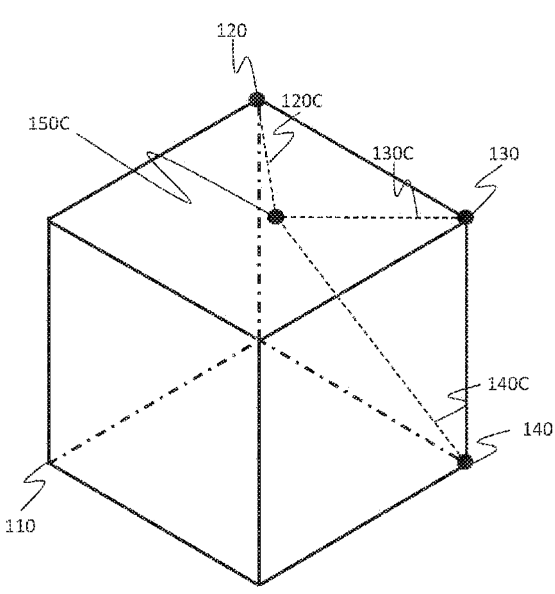

Relatedly, FIG. 1C shows an embodiment wherein the indication marker 150C is positioned at a location wherein the distances between the indication marker ISOC and sub-topic markers 120 and 130 are the same (represented by distances 120C and 130C, respectively), while the distance between the indication marker ISOC and sub-topic marker 140 is greatest (represented by distance 140C). Therefore, data related to the sub-topics represented by sub-topic markers 120 and 130 will be shared/captured with a substantially similar or equal level of detail (e.g., a moderate number of aspects of the user's interest in the sub-topic will be shared/captured), whereas a lower level of data detail will be associated with the sub-topic represented by sub-topic marker 140 by reason of the larger distance 140C between the sub-topic marker 140 and the indication marker 150B).

An illustrative example of some embodiments of the present disclosure will now be discussed with reference to FIGS. 1A-1C. In some instances, a system determines that a user has an interest in a particular topic, such as sports. For example, if the system is implemented in a web-browser or as an intermediary between user input and a web browser, the user's interest in a topic can be identified based on the user's browser/search activity, the time they spend with particular content, social media interaction, media viewing trends, HDML tags, etc.

Continuing with the example, in response to determining that a user has an interest in the topic of sports, the system generates a three-dimensional map (such as the three-dimensional maps represented in FIGS. 1A-1C), and the three-dimensional map is populated with sub-topic markers (e.g., sub-topic markers 120, 130, and 140 of FIGS. 1A-1C described hereinabove) associated with sub-topics related to sports which the user is or could be interested in (e.g., in some instances, the system identifies sub-topics in a manner that is similar to the manner in which the system identifies topics of interest, such as by monitoring user activity). For example, with regard to sports, sub-topics may include types of sports (e.g., baseball, basketball, football), leagues, associations, etc.

Upon identifying topics and/or sub-topics, the system determines or identifies the location of the indication marker (e.g., such as indication markers 150A-C shown in FIGS. 1A-1C). The location of the indication marker can be determined by methods similar to those described above for identifying a user's interest in a particular topic, and/or the location of the indication marker can be selected/identified by user input (e.g., by rendering a representation of the three-dimensional map and allowing a user to manipulate the position of the indication marker, or by allowing the user to select one of a plurality of presets associated with different levels of data privacy and a corresponding location for the indication marker).

In some embodiments, the level(s) of detail at which data related to the various sub-topics will be captured by the system and/or shared with other systems corresponds to the proximity of the indication marker to the various sub-topic markers. A high level of detail corresponds to data related to a high number of aspects of the user's interest in the relevant topic/sub-topic becoming shared/captured, whereas a low level of detail corresponds to data related only to a small number of aspects of the user's interest in the topic/sub-topics becoming shared/captured.

Referring once again to FIG. 1A and continuing on with the example regarding sports, the various sub-topic markers of FIG. 1A can be thought of as corresponding to different types of sports (e.g., different sub-topics within the topic of sport). Illustratively, sub-topic marker 120 is associated with the sub-topic of baseball, sub-topic marker 130 is associated with the sub-topic of basketball, and sub-topic marker 140 is associated with the sub-topic of football. The indication marker 150A is shown as being positioned closest to sub-topic marker 120 and furthest from sub-topic marker 140. As such, based on the position of the indication marker 150A with respect to the various sub-topic markers 120, 130, and 140, data associated with fewer aspects of the user's interest in football will be captured/shared (e.g., only that the user is generally interested in the sport of football), whereas data associated with a greater number of aspects of the user's interest in baseball will be captured/shared (e.g., not only that the user is generally interested in the sport of baseball, but also which baseball leagues and/or teams the user is interested in).

FIG. 1B shows an indication marker ISOB that is at the same location as sub-topic marker 120 (which represents the sport of baseball, per the current example), indicating that data related to all aspects of the user's interest in baseball will be captured/shared (e.g., not only which leagues and/or teams the user is interested in, but which baseball players the user follows, which stadiums the user prefers, which baseball paraphernalia the user searches for, etc.). FIG. 1C, on the other hand, shows an indication marker ISOC that is located equidistant from sub-topic markers 120 and 130 (representing the sub-topics of baseball and basketball, respectively), such that data related to a limited but equal number of aspects of the user's interest in both baseball and basketball will be captured/shared (e.g., data related to the user's preferred baseball and basketball teams, but not data related to which baseball and basketball players the user is most interested in).

Although the level of detail associated with each sub-topic has been described, in the foregoing embodiments, as being related to the distance between the indication marker and the various sub-topic markers, those skilled in the art will recognize that the level of detail may be defined by other distances, measurements, factors, etc. For instance, in some embodiments, the distance between any one of the sub-topic markers (120, 130, and 140) from the point of origin 110 corresponds with a scale that defines a level of detail. If the indication marker is positioned at the point of origin 110, no detail can be shared. Similarly, full detail for the sub-topic is shared/captured if the indication marker 150A is at least one hundred percent of the distance from the point of origin 110 to the sub-topic's corresponding marker (120, 130, or 140).

FIG. 1 D shows an alternative embodiment including a plurality of indication markers 121, 131, and 141, each being associated with different sub-topic markers 120, 130, and 140, respectively. The indication markers are positioned along various sub-topic axes 120D, 130D, and 140D, each sub-topic axis being associated with a sub-topic (sub-topic markers 120, 130, and 140, respectively). As is shown, the sub-topic axes extend from the point of origin 110 to the various sub-topic markers. In some embodiments, different locations along the sub-topic axes 120D, 130D, and 140D represent different levels at which data pertaining to the relevant sub-topic will be shared/captured. For example, a location close to the point of origin 110 (e.g., indicative of a smaller distance along a sub-topic axis extending away from the point of origin 110) indicates a smaller percentage of data that will be shared/captured, whereas a location close to a sub-topic marker (e.g., indicative of a larger distance along the sub-topic axis) indicates a larger percentage of data that will be shared/captured.

Figure 1D:
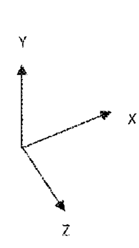
Figure 1D:
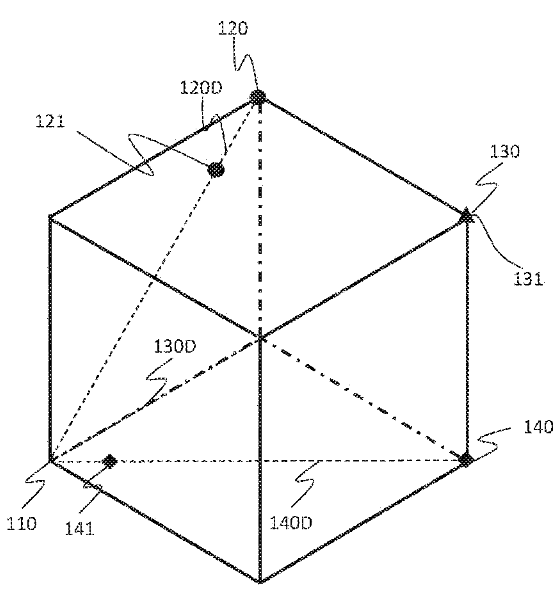

As shown in FIG. 1D, various indication markers exist for the various sub-topic markers. Indication marker 121 is located along sub-topic axis 120D in close proximity to sub-topic marker 120, which indicates that data related to a relatively high number of aspects of the user's interest in the sub-topic represented by sub-topic marker 120 will be captured/shared by the system. Indication marker 131 is located along sub-topic axis 130D at the same location as sub-topic marker 130, which indicates that data related to all aspects of the user's interest in the sub-topic represented by sub-topic marker 130 will be captured/shared by the system. Indication marker 141 is located along sub-topic axis 140D in close proximity to the point of origin 110, which indicates that data related to a relatively low number of aspects of the user's interest in the sub-topic represented by sub-topic marker 140 will be captured/shared by the system.

It will be appreciated that any number of sub-topic markers, sub-topic axes, and/or indication markers can be utilized to specify a level of detail at which data related to the user's interest will be captured/shared by the system.

Aspects of the user's interest in particular topics/sub-topics can be determined as a function of how suggestive each aspect of the user's interest is of the user's consumer/behavioral habits. For example, aspects of the user's interest that indicate a general interest in certain topics (e.g., general, non-specific search terms used by the user to find unspecified subject matter) are not highly suggestive of the user's consumer/behavioral habits (e.g., search terms to gam information about a broad topic), whereas aspects of the user's interest that indicate a particularized interest in certain topics (e.g., specific search terms used by the user to find specific subject matter) are highly suggestive of the user's consumer/behavioral habits (e.g., search terms to find/purchase tickets to a particular event). In some instances, aspects are ranked based on how suggestive they are of a user's behavior, and a threshold relationship between the indication marker and the relevant sub-topic marker is defined to determine whether the aspect will be shared/captured based on the relationship between the indication marker and the relevant sub-topic marker. In some embodiments, highly suggestive aspects require a closer relationship between the indication marker and the relevant sub-topic marker in order to become shared, whereas less-suggestive aspects require only a tenuous relationship between the indication marker and the relevant sub-topic marker in order to become shared.

Figure 1E:
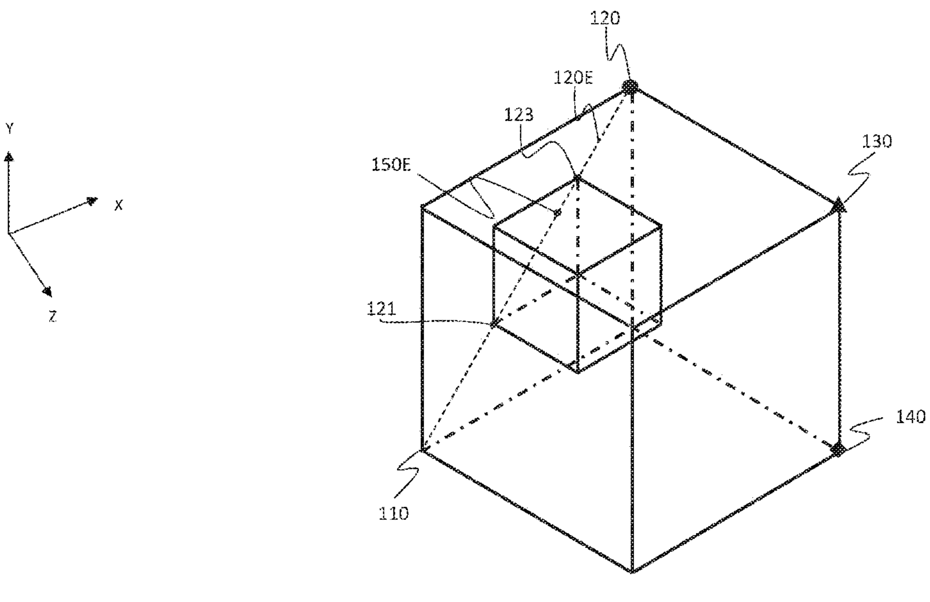

FIG. 1E illustrates a schematic representation of aspect markers (e.g., 121, 123) being ranked along a sub-topic axis 120E associated with a particular sub-topic 120. As shown, aspect marker 121 is positioned closely to origin point 110 and far from sub-topic marker 120, indicating that the indication marker ISOE need only surpass a low threshold distance from the point of origin 110 in order to trigger the capturing/sharing of data pertaining to the aspect associated with aspect marker 121. In contrast, aspect marker 123 is positioned more closely to sub-topic marker 120 than it is to the point of origin 110, suggesting that the indication marker ISOE must surpass a higher threshold distance from the point of origin 110 to trigger the capturing/sharing of data pertaining to the aspect associated with aspect marker 123. In the embodiment shown, indication marker 150E is positioned between aspect marker 121 and 123, so data related to aspect marker 121 will be captured/shared, whereas data related to aspect marker 123 will not be captured/shared.

The foregoing description has referred embodiments in which aspects of the user's interest in certain topics/sub-topics, and that the level of detail of data to be shared can be determined as a number of aspects of the user's interest that will be shared. Those skilled in the art will recognize that this mechanism for calculating the level of detail to be shared is non-limiting, and illustrative only.

Although the foregoing description has focused on three-dimensional mapping, those skilled in the art will recognize that other multi-dimensional systems are utilizable within the scope of the present disclosure. For example, the data can be stored in a four-dimensional space including a color sequencing code or similar alternatives to add an additional means of filtering the data and selecting the level of detail.

Figure 2:
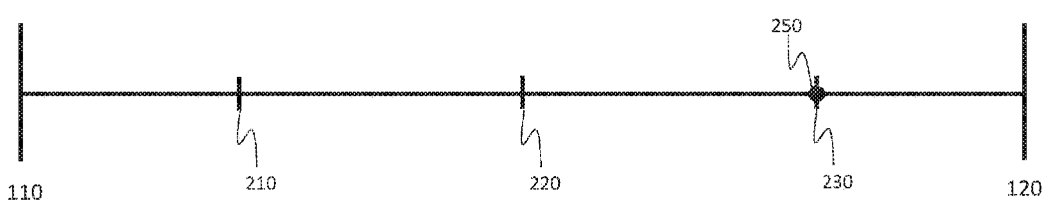
FIG. 2 illustrates a projection of the level of detail of a sub-topic onto a two-dimensional map according to one or more embodiments of the present disclosure.

Attention is now directed to FIG. 2 which depicts an example rendering of an alternative embodiment for user interaction to adjust the level of interest one or more sub-topics. In one embodiment, the system renders to the user a single axis sliding scale 200A. Sections along the single axis sliding scale 200A (e.g., the space between stopping points 210, 220, and/or 230) can indicate the level of detail the user elects to allow to be shared. The single axis sliding scale 200A depicted extends from the origin point 110 (corresponding to a user selection wherein no data becomes shared) to a sub-topic marker 120 (corresponding to a user selection wherein the full amount of data becomes shared). Indicators along the single axis sliding scale may be stopping points for the indication marker 250 to set the level of detail of the data to be shared. For example, if the relevant sub-topic is baseball, a first stopping point 210 may indicate a level of detail wherein the user's geographic preferences for teams becomes disclosed (e.g., the user prefers west coast teams), a second stopping point 220 may indicate a level of detail wherein the user's league preferences become disclosed (e.g., the user prefers major league west-coast teams), and a third stopping point 230 may indicate a level of detail wherein the user's specific team preferences become disclosed.

Alternative embodiments may allow the indication marker 250 to be placed anywhere along the single axis sliding scale 200A and the level of detail to be calculated based on the position relative to the origin marker 110 and the sub-topic marker 120.

The single axis sliding scale 200A may be used, in some embodiments, to adjust the level of detail and indication marker 150A within the three-dimensional map 100A seen in FIG. 1A The level of detail defined by the indication marker 250 on the single axis sliding scale 200A is projected into the three-dimensional space and may be used to update the level of detail of the data to be shared.

In some instances, the system creates a user profile comprising one or more three-dimensional maps or other indications of the user's preferences regarding the level of detail of the user's data that will be shared with other computing systems. As such, in some embodiments, the user profile includes one or more topics and/or sub-topics of interest and an associated level of detail defined by the user for each topic and/or sub-topic included in the user profile.

Figure 3A:
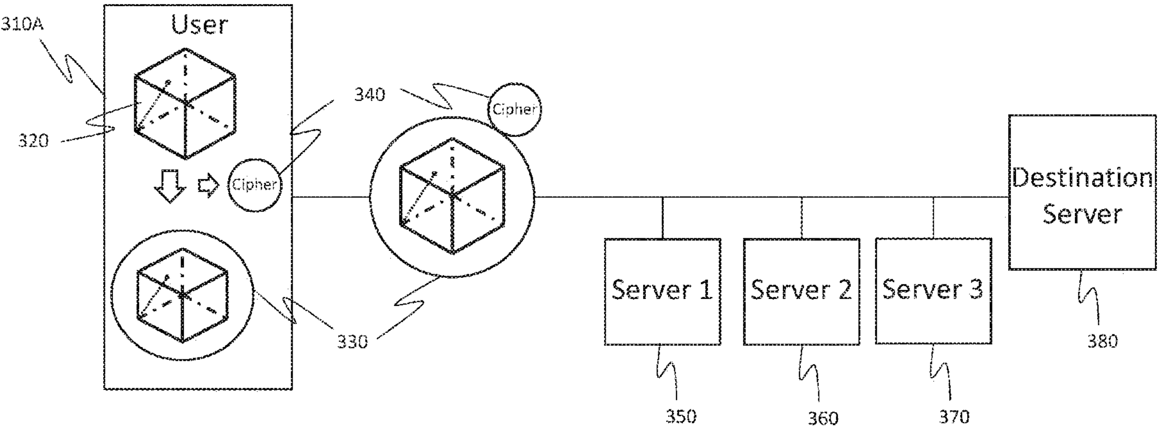
FIG. 3A illustrates a system for obfuscating and sending data according to one or more embodiments of the present disclosure.

In some embodiments, the system obfuscates the user profile and/or data associated therewith (e.g., three-dimensional maps) and creates/identifies ciphers. FIG. 3A shows an embodiment of a system that uses the data and user profile to grant access to specified data to particular systems along the route to an end location.

In some embodiments, when the user 310A generates data the three-dimensional map 320 is created to organize the data into topics and sub-topics. When the system prepares the data to be sent to a destination server 380, the system packs the three-dimensional map 320 and the data generated into data packets 330 for obfuscation, and the system creates a cipher 340. The cipher data packets 330 are sent together to the destination server 380 and may encounter other severs (350, 360, and 370) en route. In some embodiments, the cipher contains information to determine whether a particular server is permitted access to any of the data of the data packets 330. As the data packets 330 and cipher 340 are handled by server I (350), server I (350) accesses the data of the data packets 330 according to the information contained within the cipher 340 (i.e., whether and how much data server I (350) is permitted to access). Other intermediary computing devices (e.g., servers 2 and 3 (360, 370)) also attempt to access the information contained within the data packets 330. If cipher 340 only allows for server I (350) to access the data packets 330, then servers 2 and 3 (360, 370) are precluded from doing so as the data packets 340 pass by these servers en route to the destination server 380.

In some embodiments, more than one cipher can be created and sent with the package, each cipher being specific to a different server, and allowing multiple servers to access potentially different levels of data within the package (e.g., different servers can be constrained to only access data for certain users within the data package, and only according to the level of detail specified by those particular users).

In some embodiments, the package can contain the data, three-dimensional maps, and user profiles from one or more users, the ciphers further indicating which set of user data the server is allowed to access as well as the level of detail of that user's data.

The obfuscation and deobfuscation method can be various methods including but not limited to spin and lock obfuscation and call and response encoding.

Spin and lock obfuscation includes, in some embodiments, mapping the data being sent on a two-dimensional plane, and translating/transforming the data along an axis towards the center of the map followed by rotating the data about the center of the map. In order to deobfuscate the data, the system must apply the same translation/rotation steps to the data packet in reverse in order to properly interpret the data. Although a two-dimensional plane is described above, any multi-dimensional structure is utilizable for spin and lock obfuscation. Furthermore, any transformation, distortion, or other mathematical function/operation (e.g., movement of data points along a particular arc length) can be utilized to obfuscate the data.

Call and response encoding can, in some embodiments, include a keyword inside the cipher. When the package encounters a server, the package sends the cipher, including the keyword, to a server en route, and receives from the server a response cipher. The response cipher also includes a keyword. If the package receives a response cipher with a keyword that corresponds to the keyword of the cipher sent by the package, the server is granted access to the data it has been authorized to access. On the other hand, if the response cipher returns a keyword that is not correct, the sever is precluded from accessing the data. In some embodiments the server is only allowed access to the data to the extent of the level of detail permitted by the user profile.

In some embodiments, rather than a keyword, the cipher includes information related to the user profile/data included in the data packet, such as coordinates/directions related to one or more of the three-dimensional maps included therein. The receiving server is then required, in some embodiments, to respond with a response cipher with coordinates/directions that correspond to those received in the cipher. For example, the cipher can include three-dimensional map directions corresponding to a point on the map configuration before an encoding process was performed on the data of the three-dimensional map (e.g., a spin and lock obfuscation step). The data packet then only grants access to the data in response to receiving a response cipher that indicates three-dimensional map directions that correspond to the previously provided map point on the map configuration after the encoding process was performed on the data of the three-dimensional map. Put differently, the cipher provides a map point before encoding, and the response cipher must return the correct post-encoding map point in order to gain access to the data. The difference between the pre-encoding and post-encoding map points, in essence, provides the directions to decode the data package and correctly interpret the data.

Other data obfuscation methods are within the scope of this disclosure, such as encryption methods related to the biometrics of the user (e.g., retinal scan, fingerprint, vocal frequency), which allows for added data protection. In some embodiments, the cipher includes biometric information provided by the user, such that a response cipher from a server must include corresponding information in order to access the data packet (e.g., a voice or fingerprint match). In effect, this approach can allow the user to prevent systems from accessing the user's data without the user's correct biometric signature.

Figure 3B:
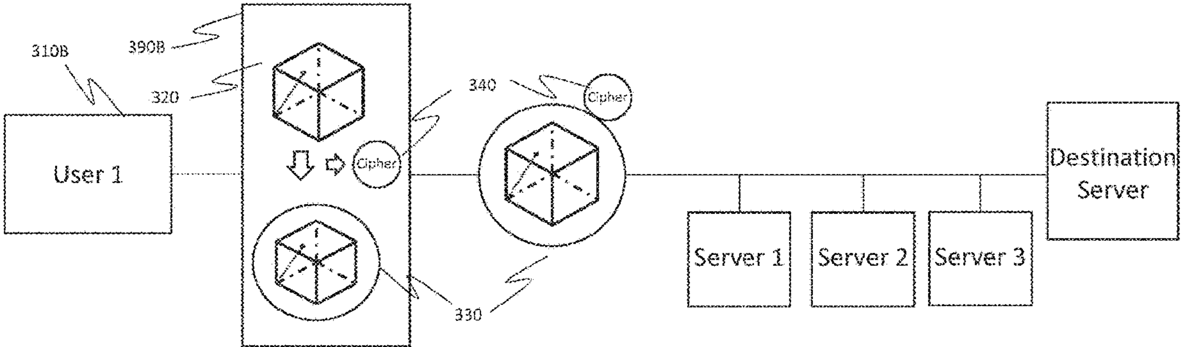
FIG. 3B illustrates a system for obfuscating and sending data according to one or more embodiments of the present disclosure.

In some embodiments as seen in FIG. 3B, the user sends their un-obfuscated data to an intermediary sever 390B which obfuscates the data and packages the data packets 330 and creates the cipher 340 for distribution. This embodiment exists, for example, when the system of the present disclosure is implemented as an intermediary between user input and a browser/operating system.

Computer Systems of the Present Disclosure

It will be appreciated that computer systems are increasingly taking a wide variety of forms. In this description and in the claims, the term "computer system" or "computing system" is defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multiprocessor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that alsoor even primarily-utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Although the subject matter described herein is provided in language specific to structural features and/or methodological acts, it is to be understood that the subject matter defined in the appended claims is not necessarily limited to the described features or acts so described. Rather, the described features and acts are disclosed as example forms of implementing the claims.

CONCLUSION

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A computing system comprising:

one or more processors; and one or more computer-readable media storing computer-executable instructions that, when executed by the one or more processors, cause the computing system to:

generate, for a topic, a multi-dimensional map representative of the topic, the multi-dimensional map having three or more dimensions, the multi-dimensional map including a point of origin, one or more sub-topic markers each representative of a sub-topic associated with the topic, and an indication marker that indicates a level of detail for each sub-topic according to a distance of the indication marker from each sub-topic marker within the multi-dimensional map;

assemble, for transmission to a destination computing device, a package including data of the topic, the multi-dimensional map, and a cipher created to allow access to the data of the topic within the package; and transmit, to the destination computing device, the package for access by the destination computing device according to one or more of the multi-dimensional map and the cipher.

2. The computing system of claim 1, wherein the computer-executable instructions, when executed by the one or more processors, further cause the computing system to:

obfuscate the package using spin and lock encoding including:

moving data points on the multi-dimensional map along an axis; and moving the previously moved data points about the origin point in the map along a specified arc length.

3. The computing system of claim 1, wherein the computer-executable instructions, when executed by the one or more processors, further cause the computing system to:

encode the data of the multi-dimensional map, wherein the cipher includes multi-dimensional map directions corresponding to a point on the multi-dimensional map configuration before the encoding.

4. The computing system of claim 3, wherein the package is accessible by the destination computing device upon receiving a response cipher that indicates multi-dimensional directions that correspond to the point on the multi-dimensional map configuration after the encoding.

5. The computing system of claim 1, wherein the computer-executable instructions, when executed by the one or more processors, further cause the computing system to:

generate the cipher.

6. The computing system of claim 1, wherein the computer-executable instructions, when executed by the one or more processors, further cause the computing system to:

organize, into one or more topics and one or more sub-topics, data collected on an individual, wherein the one or more topics include the topic.

7. The computing system of claim 6, wherein the topic is a topic of interest of the individual, wherein each sub-topic is a sub-topic of interest associated with the topic of interest.

8. The computing system of claim 7, wherein the cipher includes biometric information of the individual.

9. The computing system of claim 1, wherein the cipher grants a level of access to the data according to the level of detail indicated by the indication marker of the multi-dimensional map.

10. The computing system of claim 1, wherein the package is assembled to include multiple ciphers that, as the package travels through a plurality of servers, each of the plurality of servers is granted different access according to the multiple ciphers.

11. The computing system of claim 1, wherein the data of the topic is on the multi-dimensional map.

12. A computing system comprising:

one or more processors; and one or more computer-readable media storing computer-executable instructions that, when executed by the one or more processors, cause the computing system to:

receive, from a sending computing device, a package including data of a topic, a multi-dimensional map having three or more dimensions and that is representative of the topic, and a cipher, wherein the multi-dimensional map includes a point of origin, one or more sub-topic markers each representative of a sub-topic associated with the topic, and an indication marker that indicates a level of detail for each sub-topic according to a space between the indication marker and each sub-topic marker within the multi-dimensional map; and access, according to one or more of the multi-dimensional map and the cipher, the data of the topic, wherein a set of accessible data is accessed from the data of the topic based on the level of detail indicated by the indication marker; and provide the set of accessible data for use by one or more of a user of the computing system and an application of the computing system.

13. The computing system of claim 12, wherein the computer-executable instructions, when executed by the one or more processors, further cause the computing system to:

de-obfuscate the package according to a spin and lock encoding including:

moving data points on the multi-dimensional map along an axis; and moving the previously moved data points about the origin point in the map along a specified arc length.

14. The computing system of claim 12, wherein the computer-executable instructions, when executed by the one or more processors, further cause the computing system to:

decode the data of the multi-dimensional map using the cipher, wherein the cipher includes multi-dimensional map directions corresponding to a point on the multi-dimensional map configuration before encoding.

15. The computing system of claim 14, wherein the computer-executable instructions, when executed by the one or more processors, further cause the computing system to:

provide a response cipher that indicates multi-dimensional directions that correspond to the point on the multi-dimensional map configuration after the encoding.

16. The computing system of claim 12, wherein the topic is a topic of interest of an individual, wherein each sub-topic is a sub-topic of interest associated with the topic of interest.

17. The computing system of claim 12, wherein the package is assembled to include multiple ciphers that, as the package travels through a plurality of servers, each of the plurality of servers is granted different access according to the multiple ciphers, wherein the computing system accesses the data of the topic according to the cipher, from the multiple ciphers, corresponding to the computing system.

18. The computing system of claim 12, wherein the data of the topic is on the multi-dimensional map.

19. The computing system of claim 12, wherein providing the set of accessible data to the user comprises rendering the set of data on a display.

20. A non-transitory, computer-readable medium storing instructions that, when executed by one or more processors, cause the one or more processor to:

assemble data collected on an individual's interest in a topic and sub-topics associated with the topic and stored on a three-dimensional map;

checking for a level of detail the user has allowed to be provided to an external source;

creating a cipher to allow access to the level of detail allowed by the user;

obfuscating a package of the data using spin and lock encoding including:

moving data points on the three-dimensional map along an axis; and moving the previously moved data points about an origin point in the map along a specified arc length; and sending the package and the cipher, wherein the cipher is attached to the package.

* * * * *